2,791,561

MAGNETIC POWDERS AND METHOD OF MAKING THE SAME

Hans Beller, Cranford, and George O. Altmann, Westfield, N. J., assignors to General Aniline & Film Corporation, New York, N. Y., a corporation of Delaware No Drawing. Application April 27, 1950,
Serial No. 159,642

5 Claims. (Cl. 252—62.5)

This invention relates to improved carbonyl iron powders for electromagnetic cores, especially adapted for very high frequency applications, to a process for preparing such powders, and to cores prepared therefrom.

Iron powders prepared by thermal decomposition of iron carbonyl under the operating conditions usually employed are generally made up of particles having diameters ranging substantially from 0.5 to 15 microns. When these powders are subjected to suitable treatment for particle insulation, they yield cores having adequately low power losses in high frequency applications. However, for cores operating in the very high frequency range of 30 to 300 megacycles, powders are required having a weight average particle diameter of the order of 2 to 4 microns, the particle size range not substantially exceeding 5 microns in diameter, in order to avoid excessive power losses. Such powders can be obtained by fractionation of carbonyl iron powders produced by conventional thermal decomposition of iron carbonyl. However, the fraction obtained of fine powder suitable for very high frequency applications represents only a small proportion of the total product. The fractionating operations and the expense of separate handling, storage and marketing of the coarser fractions, for which a market is not always immediately available, renders this method for producing powders suitable for very high frequency applications relatively costly, and hence, unattractive for commercial use.

More recently, modified processes have been developed for thermal decomposition of iron carbonyl wherein iron powders are directly produced in which the particle size range does not substantially exceed 5 microns in diameter. For example, such iron powders can be directly produced by greatly increasing (e. g. at least doubling) the through-put rate of iron carbonyl in conventional thermal decomposition apparatus therefor, or by diluting the iron carbonyl with certain gases, such as ammonia, prior to decomposition. Powders thus produced may have, for example, a particle size range from 0.5 to 5 microns in diameter, thus corresponding to the particle size range required for very high frequency cores, without the necessity of fractionation.

However, it has been found that when carbonyl iron powders of the aforesaid reduced particle size range, directly produced by thermal decomposition of iron carbonyl, are made into cores by methods heretofore successfully employed in the case of relatively coarse carbonyl iron powders produced by conventional thermal decomposition of iron carbonyl, or relatively fine fractions thereof, the resulting cores do not possess the efficiency at very high frequencies which would be expected from the reduced particle size range of the powders. Thus, when these directly produced powders, having a weight average particle diameter of 2 to 4 microns, are thoroughly mixed by tumbling with insulating materials such as water glass, phosphates, varnishes or resins, ordinarily applied in the presence of a liquid or solvent vehicle which is removed by evaporation, and the resulting insulated powder molded into cores with a suitable binder, the loss characteristics of the cores is found to be comparable with those prepared from ordinary carbonyl iron powders having a weight average particle diameter of 5 to 10 microns, and the cores were therefore unsatisfactory for use at very high frequencies of 30 to 300 megacycles. Moreover, on molding, the relatively fine particles of the specially produced powders were apparently disarranged sufficiently to make metallic contact, and the cores possessed very low resistivity, contributing to excessive power loss through eddy currents and leakance.

Apparently the carbonyl iron powders, when directly produced so as to have a particle size range up to about 5 microns in diameter, have a pronounced tendency to form clusters or agglomerates. In part, this is due to increased surface energy (which is proportional to the ratio of surface to mass, and thus increases inversely as the particle diameters), and particularly to the pronounced tendency of these particles to possess finite resultant magnetic moments producing the strong magnetic attraction between the particles. In the case of larger particles, the relatively large number of magnetic domains readily cancel each other so that the resultant magnetic moment of the individual particles is substantially zero; whereas the probability of such cancellation between the relatively small number of magnetic domains in the particles of fine powders is greatly reduced, and particles having finite magnetic moments appear to be especially prevalent in powders of a particle size up to 5 microns in diameter, produced directly by thermal decomposition of iron carbonyl. The clusters or agglomerates of these powders, when subjected to the processes heretofore known for particle insulation, preparatory to making them into cores, are apparently not broken up but are insulated only on the outside surfaces of the clusters, and the latter therefore act like relatively large particles in the cores produced.

It is an object of this invention to provide powders yielding cores of high resistivity and low power losses at very high frequencies, from carbonyl iron powder produced directly by thermal decomposition of iron carbonyl under conditions such that the weight average particle diameter is, in general, not more than 4 microns (i. e. 2 to 4 microns) and wherein the particle size range does not substantially exceed 5 microns in diameter, e. g. a range substantially from 0.5 to 5 microns. It is also an object of the invention to provide cores made from such powders which have low power losses at very high frequencies (i. e., within the range of 30 to 300 megacycles) as well as of lower frequencies, and which are characterized by high resistivity. A further object of this invention is to provide a process for making powders having the aforesaid characteristics, as well as the cores prepared therefrom.

We have discovered that powders suitable for accomplishing the foregoing objects can be made by subjecting the aforesaid carbonyl iron powders directly produced by thermal decomposition of iron carbonyl under such conditions as to produce a particle size range not substantially exceeding 5 microns in diameter and having a weight average particle diameter of not more than 4 (e. g. 2 to 4) microns, to vigorous impact milling in the presence of a relatively small amount of a non-conductive particle declustering or particle separating material which penetrates the iron particle clusters and ultimately yields a non-conductive, non-corrosive particle separating deposit on or between the particles, the impact milling operation being continued until the apparent density of the resulting powder increases to at least 2.3 grams per cc., whereby the aforesaid particle separating deposit is distributed substantially uniformly throughout the powder. (The aforesaid apparent density of the powder means the apparent density measured by allowing a known weight of the powder to fall freely in a volume measuring device, e. g. a Scott volume meter, in which the volume of the loosely formed mass is measured without compacting by tapping or any other manner. The apparent density of the powder before impact milling is about 1.) Suitable particle separating materials or "declustering agents" employed in the impact milling operation according to this invention, include finely divided solids having a particle size of a lower order than that of the iron powder employed (i. e., an average particle diameter less than one-tenth the average particle diameter of the iron powder and, in general, less than 0.1 micron), so as to interpenetrate the clustered particles. Suitable solid declustering materials include powdered non-conductive inorganic solids such as solid silicates, metal oxides, metal sulfides and the like. These materials are preferably milled with the directly produced superfine carbonyl iron powders of the invention in a dry state.

In addition, the particle separating materials employed in accordance with the invention include glassy resins such as solid silicones, which can be mixed with the carbonyl iron powder in the form of a solution in a volatile solvent, evaporated before impact milling or during the initial stage thereof to leave a solid glassy film of resin on the particles, which is pulverized by continuing the impact milling of the powder in the dry state.

Another class of materials suitable for use as cluster-penetrating and particle-separating agents comprises normally solid unguentous fatty or waxy materials of high melting point, such as stearic acid; or better, the saturated monohydric alcohols corresponding to the higher fatty acids of natural glycerides. These materials can be added directly to the carbonyl iron powder and impact milled therewith, whereby they form a durable non-conductive separating film on the iron particles.

Furthermore, reagents which form a non-conductive separating deposit on the iron particles by chemical reaction, such as phosphoric acid or propionic acid, can be incorporated with the iron powder with impact milling, especially in the presence of a volatile solvent, preferably an organic solvent, which is removed during or after the impact milling operation by evaporation.

More than one of the particle-separating agents can be applied successively to the iron powder in the impact milling treatment.

When a solid particle-separating agent is employed, in the impact milling operation, the powder thereby produced is advantageously subjected to particle-insulating treatment with a liquid adapted to form an insulating coating on the individual particles, sufficiently durable to withstand subsequent core molding operations. Inorganic insulating coatings are in general most suitable for this purpose. Such coatings can be formed by chemical reaction with the particles, by chemical reaction within the coating solution, or by evaporation of a solution of the coating composition after thorough admixture with the powder. We prefer to employ phosphoric acid for this purpose. The acid can be thoroughly mixed with the impact-milled powder, in the form of a solution in a volatile organic solvent, as described above for use in the impact milling operation, and the solvent then evaporated. Instead of phosphoric acid, other compositions forming a durable insulating coating on the particles can be used, such as alkali metal silicates which can be applied in aqueous solution and the water subsequently evaporated. The mixing required for the particle insulating treatment can be carried out by conventional tumbling, or by further impact milling.

The powders thus prepared are made into cores by incorporating therewith a suitable binder, molding under high pressure into the desired shape, and if necessary, curing the binder. The cores thus obtained are characterized by high resistivity and possess high Q-values not only at high frequencies but also at very high frequencies from 30 to 300 megacycles, as distinguished from cores prepared from the same carbonyl iron powders insulated with the same materials, but by conventional mixing methods rather than impact milling.

The reason for the improvement effected by the process of this invention is not fully understood. Apparently, impact milling causes the separating material to penetrate the interstices of the particle clusters, whereas conventional mixing methods merely insulate or cover the surfaces of the clusters, leaving the individual particles in electrical contact.

Impact milling, as employed in this invention, can be carried out in any suitable apparatus such as a ball mill, tube mill, rod mill, or hammer mill operating at sufficient speed to insure impact of the comminuting elements of the mill on the particles undergoing treatment, rather than mere frictional attrition. It has been found that mere attrition, whether solid or fluid, is inadequate to produce the improved results of this invention.

The process of the invention is illustrated by the following examples:

*Example 1*

50 grams of iron powder, directly produced by thermal decomposition of iron carbonyl at a high through-put rate, having a weight average particle diameter of about 3 microns and a particle size range up to about 5 microns, and characterized by an abundance of particle clusters, were mixed with 1 gram of silica dust having an average particle diameter of less than 0.1 micron, and the mixture was milled for 16 hours in a ball mill (having a diameter of 3½ inches and a length of 8 inches) containing 40 steel balls of ¾-inch diameter and rotating at 75 R. P. M. The apparent density of the powder (as measured in a Scott volume meter) had attained a value exceeding 2.3 grams per cc. at the end of the milling period. The resulting powder was then mixed with a solution of 1 cc. of 60% aqueous phosphoric acid in 25 cc. of acetone and heated while agitating so that the acetone and moisture gradually evaporated. The phosphoric acid treatment can be carried out in the ball mill or in a separate mixing apparatus. Four percent by weight of a resinous binder was incorporated with the resulting powder, e. g. by thoroughly mixing the latter with a solution of 2 grams of furfural-formaldehyde resin in 10 cc. of acetone, and evaporating the solvent from the mixture. A small amount (½% by weight of the powder) of a natural or synthetic wax or wax-like material such as Acrawax or stearic acid was incorporated, preferably before molding, to serve as a mold lubricant. The mixture was then molded at a pressure of 60 tons per square inch into cylindrical cores ¾-inch long and ⅜-inch in diameter and the resin binder cured by heating the molded cores at a temperature of 170° C. for ½ hour. The resulting cores were tested for Q-value (measured by means of a Q-meter) and resistivity (measured by means of mercury electrodes and a megohm meter).

For purposes of comparison, cores were similarly made and tested, except that in one case the silica dust was omitted although the impact milling operation was applied, and in a second case, the silica dust was mixed with the powder by thorough agitation but without impact milling. The results of these tests are set out in the following table:

Q-VALUES
(Henries x radians/sec./ohm)

| Frequency | Core of this Example | Core Without SiO$^2$ | Core Without Impact Milling |
|---|---|---|---|
| 500 kc./sec. | 220 | 191 | 190 |
| 30 mc./sec. | 160 | 114 | 121 |
| 60 mc./sec. | 152 | 108 | 107 |

RESISTIVITY (Megohm-cm.)

| | | |
|---|---|---|
| >50,000 | 1.35 | 8.7 |

Comparison of the resistivities of the cores tested clearly demonstrates the enormous advantage obtained by impact milling the iron powder with silica dust employed as the separating medium. The Q-value similarly reflects the increased efficiency of the core prepared in accordance with the example, especially at very high frequencies as compared with cores prepared without impact milling or without the insulating material.

*Example 2*

50 grams of carbonyl iron powder of the same type employed in Example 1, were thoroughly mixed with a solution of 2 grams of cetyl alcohol in 25 cc. of carbon tetrachloride. The carbon tetrachloride was evaporated, and the powder placed in a ball mill and subjected to milling action therein, as described in Example 1, until the powder attained an apparent density exceeding 2.3 grams per cc. The resulting powder was subjected to further insulating treatment with phosphoric acid and made into cores in the manner described in the preceding example. The cores were tested for Q-value at various frequencies and for resistivity, with the following results:

| Frequency | Q-Value |
|---|---|
| 500 kc. | 213 |
| 30 mc. | 154 |
| 60 mc. | 149 |

| Resistivity |
|---|
| >10,000 megohms |

*Example 3*

A 50-gram sample of carbonyl iron powder similar to that employed in Example 1 was thoroughly mixed with 2 grams of a silicone varnish adapted to yield solid films, the varnish containing about 50% non-volatile components, diluted with 25 cc. of carbon tetrachloride. The volatile solvents were evaporated, and the powder then subjected to impact milling in a ball mill, as described in Example 1, until the apparent density of the powder increased to more than 2.3 grams per cc. The glassy deposit formed by the silicone resin was apparently comminuted by the ball milling operation to a fine powder forming a particle separating deposit. The resulting powder was treated with phosphoric acid and made into cores as described in Example 1. On testing the cores for Q-value and resistivity, the following results were obtained:

| Frequency | Q-Value |
|---|---|
| 500 kc. | 213 |
| 30 mc. | 160 |
| 60 mc. | 154 |

| Resistivity |
|---|
| 6,000 megohms |

*Example 4*

A 50-gram sample of carbonyl iron powder of a particle size range employed in Example 1, having an abundance of clusters, was subjected to ball milling, as described in the preceding examples, in the presence of 0.5 gram of propionic acid diluted with 25 cc. of water. After the ball milling operation, the water was evaporated. Ball milling was continued until the apparent density of the dried product exceeded 2.3 grams per cc. The powder was then treated with phosphoric acid and made into cores as described in Example 1, which on testing yielded the following Q-values:

| Frequency | Q-Value |
|---|---|
| 30 mc. | 157 |
| 60 mc. | 150 |

*Example 5*

Two pounds of carbonyl iron powder of the particle size range employed in Example 1, and showing an abundance of clusters, were introduced together with 0.02 pound of colloidal clay (of which the particles had a weight average particle diameter of less than 0.1 micron) into a 4-gallon ball mill containing 20 pounds of steel balls of ½-inch diameter. The mixture was milled for 6 hours at 39 R. P. M. At the end of this period the powder had an apparent density in excess of 2.3 grams per cc. The powder was treated with phosphoric acid and made into cores as described in Example 1. On testing these cores for Q-value and resistivity, the following results were obtained:

| Frequency | Q-Value |
|---|---|
| 500 kc. | 220 |
| 30 mc. | 155 |
| 60 mc. | 143 |

| Resistivity |
|---|
| >50,000 megohms |

Similar results were obtained when the foregoing operation was repeated with 1000 pounds of carbonyl iron powder ball milled with 20 pounds of colloidal clay in a 300-gallon ball mill containing 3000 pounds of steel balls of 1¼-inch diameter, operating at 8 R. P. M. for 38 hours, whereby the apparent density of the powder was increased to more than 2.5 grams per cc.

*Example 6*

A portion of the impact milled mixture of carbonyl iron powder, prepared as described in the preceding example, in a 300-gallon ball mill, was thoroughly mixed with an aqueous solution of sodium silicate amounting on a dry basis to about 0.5% of the weight of the powder and diluted with water to a volume of 20 cc. per 100 grams of the powder, and the water evaporated, so as to provide an insulaitng coating on the particles. The resulting powder was mixed with a resin binder and molded into cores in the manner described in Example 1. On testing these cores for Q-value and resistivity, the following results were obtained:

| Frequency | Q-Value |
|---|---|
| 500 kc. | 224 |
| 30 mc. | 154 |
| 60 mc. | 143 |

| Resistivity |
|---|
| >50,000 megohms |

For purposes of comparison, cores were prepared in the same manner from the same carbonyl iron powder, similarly insulated with sodium silicate, except that the colloidal clay and the ball milling operation were omitted. On testing these cores for Q-value and resistivity, the following results were obtained:

| Frequency | Q-Value |
|---|---|
| 500 kc. | 179 |
| 30 mc. | 103 |
| 60 mc. | 85 |
| Resistivity | |
| 0.06 megohms | |

Any carbonyl iron powder of which the particle size range does not substantially exceed 5 microns in diameter, and which is subject to excessive clustering can be processed in accordance with the present invention to yield a powder forming cores of greatly improved efficiency in the very high frequency range of 30 to 300 megacycles as well as at lower frequencies, and possessing high resistivity. Such powders are especially those produced directly by thermal decomposition of iron carbonyl under conditions yielding a product in which the particle size range does not substantially exceed 5 microns in diameter (e. g. ranging from 0.5 to 5 microns), and of which the weight average particle diameter is 2 to 4 microns (e. g. about 3 microns), as produced either by dilution of the iron carbonyl undergoing decomposition in ammonia, or by increasing the through-put rate of iron carbonyl in the carbonyl decomposition apparatus. The process can also be advantageously applied to relatively coarse or fine fractions of such directly produced powders.

The particle separating materials employed in the impact milling operation include inorganic finely divided solids which are inert, especially toward the iron particles, such as silicates (e. g. silica dust, talc, magnesium silicate, colloidal clay), refractory metal oxides such as magnesium oxide, aluminum oxide or ferric oxide, and sulfides such as molybdenum sulfide, having an average particle diameter of a lower order (i. e., less than one-tenth) than that of the iron particles, said average particle diameter being less than 0.1 micron.

Inert wax-like solids such as high melting higher fatty alcohols and acids yielding insulating films on the iron particles, e. g. stearic acid, dodecyl alcohol, palmityl alcohol, cetyl alcohol and stearyl alcohol, when employed as insulating materials in the present process can be added as such to the iron powder for impact milling therewith. Inclusion of a volatile solvent for such solids, can be employed to distribute them through the mass of iron powder, the solvent being evaporated before or during the initial stages of the ball milling operation.

Glassy resinous organic materials yielding an inert pulverulent deposit on or between the iron particles, such as normally solid silicone resins (polysiloxanes), are advantageously applied to the iron powder in the form of a solution of the resin or resin-forming intermediates in a volatile solvent. The latter is evaporated before or during the initial stages of the impact milling operation. Volatile solvents employed are preferably organic solvents, such as alcohol, acetone, ether, aromatic and aliphatic hydrocarbons.

Compositions yielding solid particle-separatng precipitates as deposits or coatings on the iron particles, such as acid phosphates of magnesium, zinc or iron, are applied to the iron particles in the present process in the form of aqueous solutions from which water is evaporated in the course of impact milling or subsequent thereto. This treatment results in deposit of an inert solid phosphate coating on the particles. Similarly, acids such as phosphoric acid, which produce a phosphate film on the iron particles, or weak organic acids such as propionic acid, which form a particle separating film of basic iron salts on the particles, are likewise applied in solution, preferably in an inert organic solvent such as acetone which is readily removed by evaporation. The use of organic solvents prevents excessive local corrosion of the particles by the acid while assuring adequate distribution of the acid on the particles.

The proportion of particle-separating deposit-forming material for all of the foregoing compositions is such as to yield a particle-separating deposit ranging from 0.2 to 5% by weight of the iron powder. Volatile solvents employed as distributing agents for the deposit-forming compositions can be employed in varying amounts, a volume of solvent amounting to about one-half of the apparent volume of the powder being adequate.

Duration of impact milling required in accordance with this invention depends on numerous variables determining the intensity and efficiency of the operation. In general, periods of 5 to 40 hours have been found suitable.

In order to insure optimum electromagnetic properties in the cores prepared from the powders, it has been found advantageous to apply a liquid particle-insulating treatment to the powder after incorporation by impact milling of a solid material forming a particle-separating deposit in accordance with the invention, the liquid employed being capable of forming a durable insulating coating on the individual particles. Preferably, the insulating treatment is carried out with an organic solvent solution of phosphoric acid similar to that specified above for the impact milling operation. A suitable proportion of phosphoric acid is from 0.5 to 2.5% of the weight of the powder. The insulating treatment can be applied by impact milling or by conventional mixing while evaporating the solvent, after completion of the impact milling treatment in the presence of a different material forming a particle-separating deposit. Instead of phosphoric acid, an aqueous solution of alkali metal silicate can be used in sufficient amount to yield a deposit amounting to 0.5 to 2.5% of the weight of the powder, the insulating deposit being formed by mixing with the solution and evaporating the solvent.

In preparing cores from the powders obtained in accordance with this invention, the powder is advantageously mixed with a minor amount, e. g. 3 to 10% of its weight, of a non-conductive inert binder which can be incorporated with the powder in the form of a solution in a volatile solvent. Such binders include resins such as urea-formaldehyde, furfural-formaldehyde, melamine-formaldehyde, and phenol-formaldehyde resins, varnishes, natural or synthetic gums, or alkali metal silicates, which latter can be applied in aqueous solution. After mixing a solution of the binder with the insulated powder, the solvent is evaporated, and the powder molded at high pressure, e. g. 5 to 100 tons per square inch, to form a core. Mold stripping can be facilitated by additional inclusion of a wax, a higher fatty acid or similar mold lubricant in the powder composition. After molding, the binder is cured, if necessary, by heating at an appropriate temperature for setting the resin.

Cores prepared from the powders of this invention are distinguished by high Q-values not only at moderately high frequencies up to 1 megacycle but also at very high frequencies of the order of 30 to 300 megacycles at which cores prepared by other methods are unsuitable, because of excessive power losses. At the same time, the resistivity remains above 100 megohms, whereas in cores produced by similar methods without impact milling, or without incorporation of insulating material during the said milling, have a resistivity of a much lower order.

As employed herein and in the appended claims, "weight average diameter" means $\Sigma(wd)/W$, wherein $w$ and $d$ are the respective weights and diameters of the individual particles of a quantity of powder, and $W$ is the total weight of the powder.

Variations and modifications which will be obvious to those skilled in the art can be made in this process without departing from the scope or spirit of the invention.

We claim:

1. A process for preparing magnetic powder yielding magnetic cores having high resistivity and low power losses when operating at very high frequencies, which comprises impact milling a mixture of carbonyl iron powder, directly produced by thermal decomposition of iron carbonyl of which the weight average particle diameter is from 2 to 4 microns and the particle size range is substantially from 0.5 to 5 microns in diameter, with silica dust of which the particles have an average diameter less than one-tenth of the average diameter of the iron particles and less than 0.1 micron, in an amount from 0.2 to 5% of the weight of the iron powder, continuing impact milling of the mixture until the resulting powder has an apparent density when dry of at least 2.3 grams per cubic centimeter and said silica dust is uniformly distributed throughout the mixture, thoroughly mixing the resulting powder with 0.5 to 2.5% of $H_3PO_4$ in solution in a volatile organic solvent, and evaporating the solvent.

2. Magnetic powder yielding magnetic cores having high resistivity and low power losses when operating at very high frequencies, which essentially consists of an impact-milled powder of which the particles are carbonyl iron directly produced by thermal decomposition of iron carbonyl so as to have a weight average diameter of 2 to 4 microns, and a particle size range not substantially exceeding a diameter of 5 microns, having a solid, non-conductive inert particle-separating deposit on the particles, said deposit amounting to 0.2 to 5% of the weight of the iron and being uniformly distributed throughout the powder, said particles having thereon a subsequently formed insulating coating of iron phosphate formed by treatment with phosphoric acid after formation of said deposit, and said powder having an apparent density when dry of at least 2.3 grams per centimeter.

3. Magnetic powder yielding magnetic cores having high resistivity and low power losses when operating at very high frequencies, which essentially consists of an impact-milled mixture of carbonyl iron directly produced by thermal decomposition of iron carbonyl so as to have a weight average particle diameter of 2 to 4 microns, and a particle size range not substantially exceeding a diameter of 5 microns, with 0.2 to 5% of its weight of silica dust of which the particles have an average diameter less than one-tenth of the average diameter of the iron particles and less than 0.1 micron, said silica dust being deposited on the iron particles and uniformly distributed throughout the powder, said iron particles further having an insulating phosphate coating formed by reaction of phosphoric acid with the particles after the impact milling operation, and said powder having an apparent density when dry of at least 2.3 grams per cubic centimeter.

4. A magnetic core having high resistivity and low power losses when operating at very high frequencies, which essentially consists of a pressure molded mass of an impact-milled powder of which the particles are carbonyl iron directly produced by thermal decomposition of iron carbonyl so as to have a weight average diameter of 2 to 4 microns, and a particle size range not substantially exceeding a diameter of 5 microns, and having silica dust of which the particles have an average diameter less than one-tenth of the average diameter of the iron particles and less than 0.1 micron, deposited in an amount from 0.2 to 5% of the weight of the iron powder on the particles of the latter and being uniformly distributed throughout the powder, said iron particles further having an insulating phosphate coating formed by reaction of phosphoric acid with the particles in the presence of a volatile solvent after the impact milling operation, said powder having an apparent density when dry of at least 2.3 grams per cubic centimeter, and a heat-cured furfural-formaldehyde resin binder amounting to 3 to 10% of the weight of the powder.

5. Magnetic powder yielding magnetic cores having high resistivity and low power losses when operating at very high frequencies, which essentially consists of an impact-milled mixture of carbonyl iron directly produced by thermal decomposition of iron carbonyl so as to have a weight average particle diameter of 2 to 4 microns, and a particle size range not substantially exceeding a diameter of 5 microns, with 0.2 to 5% of its weight of colloidal clay of which the particles have an average diameter less than one-tenth of the average diameter of the iron particles and less than 0.1 micron, said colloidal clay being deposited on the iron particles and uniformly distributed throughout the powder, said iron particles further having an insulating phosphate coating formed by reaction of phosphoric acid with the particles after the impact milling operation, and said powder having an apparent density when dry of at least 2.3 grams per cubic centimeter.

References Cited in the file of this patent

UNITED STATES PATENTS

| | | |
|---|---|---|
| 1,783,560 | Eisenmann et al. | Dec. 2, 1930 |
| 1,789,477 | Roseby | Jan. 20, 1931 |
| 2,169,732 | Legg | Aug. 15, 1939 |
| 2,232,352 | Verweij et al. | Feb. 18, 1941 |
| 2,330,590 | Kaschke | Sept. 28, 1943 |
| 2,503,947 | Haskew | Apr. 11, 1950 |
| 2,508,705 | Beller et al. | May 23, 1950 |
| 2,563,520 | Faus | Aug. 7, 1951 |

FOREIGN PATENTS

| | | |
|---|---|---|
| 616,249 | Great Britain | Jan. 19, 1949 |